United States Patent Office 3,159,209
Patented Dec. 1, 1964

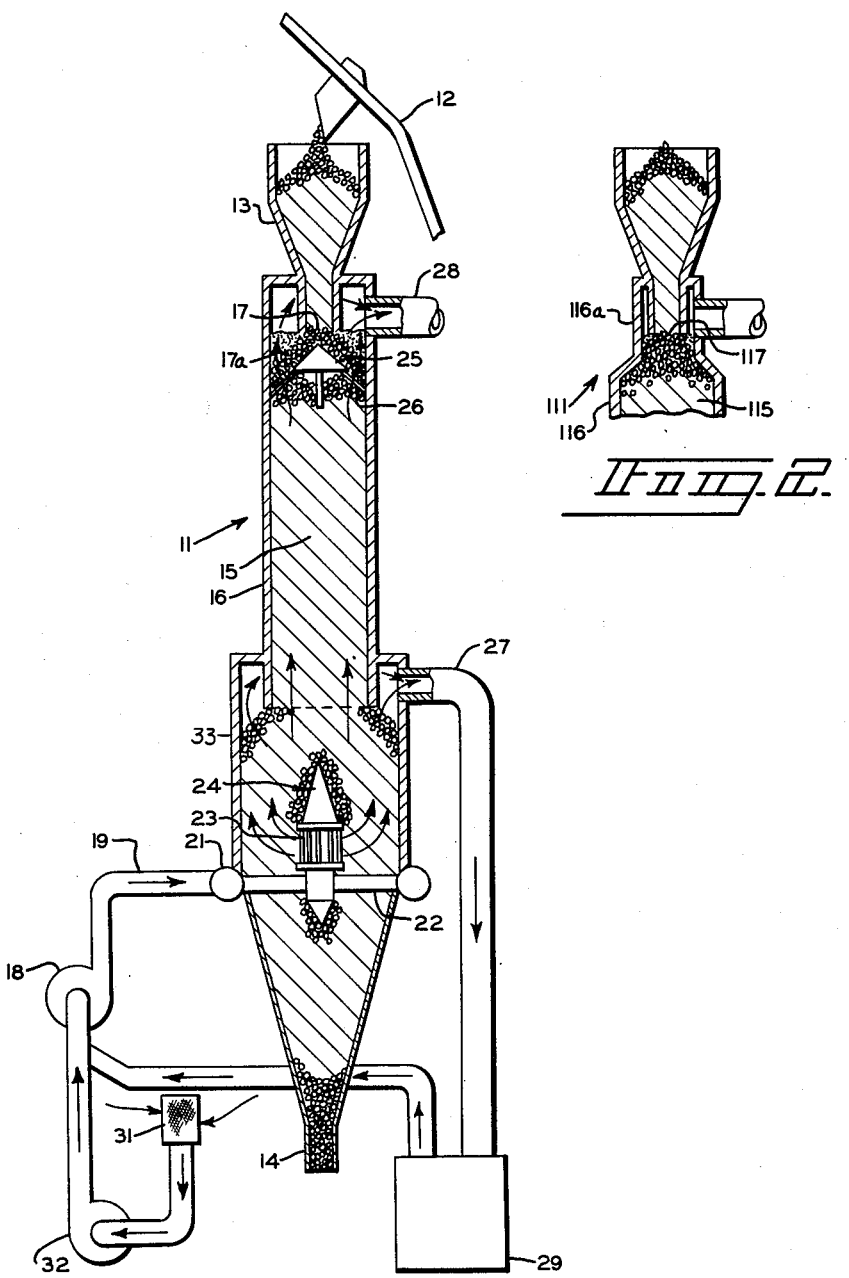

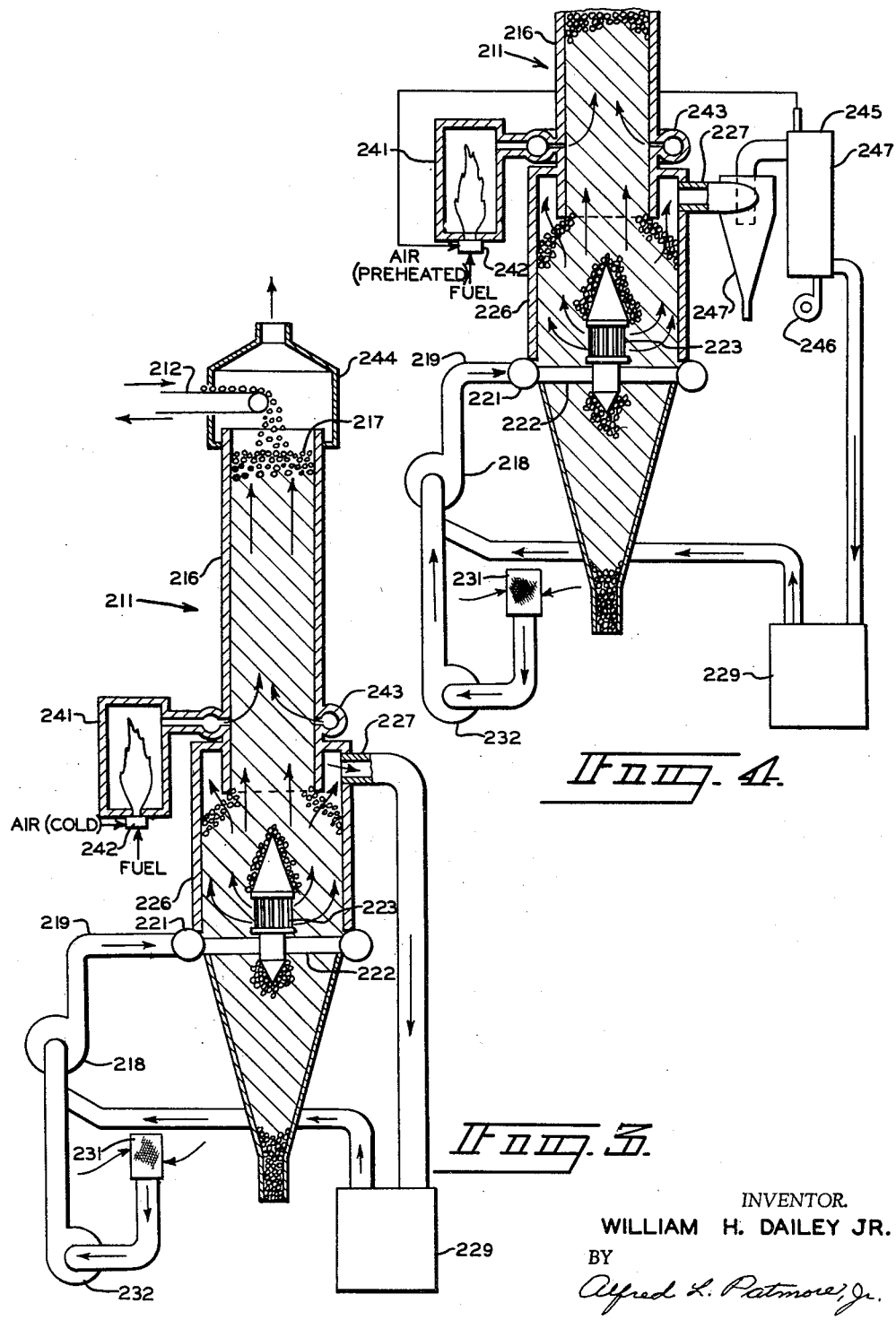

3,159,209
ALTERING THE HEAT CONTENT OF
SOLID MATERIALS
William H. Dailey, Jr., Toledo, Ohio, assignor to Midland-
Ross Corporation, Toledo, Ohio, a corporation of Ohio
Filed Mar. 28, 1961, Ser. No. 98,560
6 Claims. (Cl. 165—1)

This invention relates to the art of processing solid materials which are capable of forming a fluent gas-pervious mass and is directed to methods and apparatus for altering the heat content of such materials. The invention is particularly suited for altering the heat content of various classes of agglomerates of ore including pellets and briquettes. One embodiment of the invention comprises shaft-type cooling apparatus for cooling solid materials, such materials having been previously heated by external means. Another embodiment of the invention comprises a shaft furnace for alternately heating and cooling solid materials. A further refinement of the invention, which is particularly suited to some ore agglomerate shaft-cooling installations, comprises apparatus and method for removing objectionably small fine particles and chips from the supply of agglomerates to be processed.

For a further consideration of what I consider to be novel and inventive attention is directed to the following portion of the specification, the drawing, and the appended claims.

In the drawing:

FIGURE 1 illustrates an embodiment of shaft cooling apparatus for cooling solid materials which have been previously heated by other means;

FIGURE 2 illustrates an alternative embodiment of a portion of the apparatus illustrated in FIGURE 1;

FIGURE 3 illustrates an embodiment of a shaft furnace for alternately heating and cooling solid materials; and FIGURE 4 illustrates an alternative embodiment of a portion of the apparatus illustrated in FIGURE 3.

The apparatus shown in FIGURE 1 is a shaft-type cooling unit suitable for cooling any heated solid substance which is capable of forming a fluent gas-pervious mass. The apparatus will be described in relation to a process for cooling heated agglomerates of ore such as pellets and briquettes, but it is to be understood that the apparatus is also suited for cooling other solid materials capable of forming a fluent gas-pervious mass that require heat treatment such as small bodies of limestone, aluminum oxide, and magnesium oxide.

Agglomerates of ore are delivered to a shaft cooler, indicated generally at 11, from some external heating means (not shown) by any suitable conveying means such as elevator 12, shown fragmentarily, suited to convey agglomerates to the top of cooler 11 from a source that is lower in elevation. The agglomerates are received by cooler 11 in a surge receiving bin portion 13 and are permitted to flow through cooler 11 by gravity to outlet 14. Surge receiving bin 13 serves to discharge hot agglomerates at a relatively constant rate to the fluent gas-pervious descending bed 15 of agglomerates being cooled in cooling portion 16 of shaft cooler 11 thereby tending to maintain the upper level or stockline 17 of agglomerates in cooling portion 16 at a relatively constant elevation despite any variations in the rate of delivery of agglomerates to shaft cooler 11 by delivery means 12. It is here to be noted that stock line 17 will not be horizontal but will have a declining portion 17a due to the natural angle of repose of the material being processed.

The descending bed of agglomerates is cooled in shaft cooler 11 by passing a stream of air upwardly therethrough in direct counterflow heat transfer relationship to the agglomerates. Cooling air is delivered to the shaft cooler from a blower 18 by means of a conduit 19, manifold 21, nozzle feeder conduits 22 and injector nozzle 23 which has a conically shaped guard 24 mounted superjacent thereto and adapted to facilitate the flow of agglomerates in this region.

Located near the top of the descending bed 15, in a region slightly subjacent the stockline 17 thereof, is a centrally located conically shaped member 25 supported on a plurality of legs 26 which are, in turn, affixed to the wall of cooling portion 16. The function of member 25 is to restrict the flow of air in the region where it is mounted. Such restriction tends to increase the velocity of the air flowing in this region thereby increasing the lifting effect exerted by the aerodynamic drag of the upwardly flowing air on the descending agglomerates. Since the ratio of aerodynamic lift (which acts upwardly) to gravity (which acts downwardly) is greater with respect to small bodies than large bodies it is possible to make the restriction sufficiently large so as to increase the air velocity (hence aerodynamic lift) to a value sufficiently large to remove only objectionably small fine particles and chips from the descending agglomerates.

An alternative method of restricting the air flow through a descending bed at a point slightly below the stockline is illustrated in FIGURE 2 which illustrates a fragment of a shaft cooler 111 having a cooling portion 116. Cooling portion 116 in turn has a restricted portion 116a which restricts the flow of air (thereby increasing its velocity) through the upper portion of the descending bed 115 slightly beneath the stockline 117 thereof. This permits aerodynamic removal of ore fines and briquette chips in the same fashion as the apparatus of FIGURE 1 without requiring a special restricting member such as member 25.

The cooling air which emerges from the stockline of the descending bed will be highly heated as a result of the heat transfer to it from the agglomerates. The temperature of the air leaving the shaft cooler, in a well designed cooler, should be within 150° F. to 250° F., of the temperature of the agglomerates delivered to the cooler. In addition to the heat content of this air it may also be relatively heavily laden with ore fines and chips. It will, therefore, be appreciated that it would be economically desirable to recover both the heat value and the ore content of this air stream. A particular means for recovering both the heat value and the ore content of such an air stream is described in my co-pending application Serial No. 98,793, filed of even date herewith, now U.S. Patent 3,087,715.

In connection with the utilization of heated air from shaft cooler 11 in a subsequent heating process, such as that described in the aforesaid co-pending application, it is to be noted that the quantity of heated air required for such process is not always compatible with the quantity of cooling air which would be required to properly cool a given stream of agglomerates in a shaft cooler where a fixed quantity of cooling air is charged into the bottom of the shaft and the same quantity of air is withdrawn from the top. In view of this I propose means to limit the rate of flow of heated air from a shaft cooler to any reasonable desired value without interfering with the cooling efficiency of the shaft cooler. This may be accomplished by constructing the shaft cooler as a two-stage cooler as shown in FIGURE 1.

In addition to cooling portion 16 of shaft cooler 11, which may be considered to serve as a first stage cooling portion, there is an additional lower cooling portion 33 which serves as a second stage cooling portion. Cooling air is added to cooling portion 33 by means of nozzle 23 at a rate somewhat greater than would be required if all the air were allowed to pass completely through shaft cooler 11. This air is allowed to pass upwardly through shaft cooler 11 for only a portion of the length thereof at which point a portion of the air stream is withdrawn by means of conduit 27 which marks the point of demarkation between first stage cooler 16 and second stage cooler 33. The remaining portion of the cooling air stream passes upwardly through first stage cooler 16 from whence it is discharged through conduit 28. The magnitude of this stream may be regulated to suit the requirements of a subsequent heating process by properly sizing the first and second stage coolers with respect to one another, it being noted that the greater the cooling that is done in second stage cooler 33 the smaller the cooling that will be required of first-stage cooler 16 and therefore the magnitude of the air stream flowing therethrough will be smaller.

The air stream which is withdrawn from second-stage cooler 33 through conduit 27 will be at some temperature intermediate ambient temperature and the initial agglomerate temperature. This stream will also contain some particles of ore dust and will be at some substantial super-atmospheric pressure. Generally, it will not be practical to reclaim the heat energy of this stream by virtue of the fact that its temperature is not sufficiently high. However, it is quite feasible and indeed very important to reclaim the energy of compression stored in such air stream. This may be accomplished by passing it through a cooler 29, which is shown diagrammatically, and thence to the intake of blower 18 whereby it can be reused in shaft cooler 11.

In cases where no heat recovery from the air stream withdrawn through conduit 27 is desired cooler 29 may be a direct-contact spray type water cooler or an indirect extended surface heat exchanger. The former type of cooler is generally preferred since the direct spraying action of the water will readily wash out fine dust particles contained in the air stream which particles will collect as a readily removable sludge in the bottom of the cooler.

In addition to the air stream which is withdrawn from shaft cooler 11 and recycled back thereinto through cooler 29, it is necessary to provide make-up air in an amount equal to the air discharged from the first stage cooling portion 16 of shaft. This air is obtained from the atmosphere and is drawn into the system through a filter 31. Since this air, which is at atmospheric pressure, is at a pressure considerably less than the air being re-cycled through cooler 29, a blower 32 is provided to compress the make-up air to a pressure substantially equal to the pressure of the recycled air. The make-up air, after being compressed by blower 32 is then delivered to blower 18 where both it and the recycled air are compressed to operating pressure.

The principle of the two-stage alteration of the heat content of agglomerates of ore in shaft-type heat transfer apparatus, which has been described above in relationship to a shaft cooler, is also applicable to a shaft furnace, such as that indicated generally at 211 of FIGURE 3, wherein the agglomerates are consecutively heated and cooled in heating stove 216 and cooling stove 226. Such agglomerates which may, for example, comprise balls of ore from a balling drum are delivered to heating stove 216 of shaft furnace 211 by appropriate conveying means such as conveyor 212, shown fragmentarily. The agglomerates may either be cold or partially heated depending on other process requirements. Where the agglomerates are comprised of balls from a balling drum it will not generally be necessary to provide means to remove fine particles therefrom. In such cases it will then generally not be necessary to provide a surge receiving bin to stabilize the stockline 217 in the shaft and it will therefore be appropriate to discharge the agglomerates directly to the shaft from conveyor 212. Heating of the agglomerates in heating stove 216 is accomplished partially by means of combustion products from combustion chamber 241 which is provided with a burner 242 for combusting streams of fuel and air. The products of combustion from chamber 241 are delivered peripherally to heating stove 216 by means of bustle pipe 243. The remainder of the heat for the agglomerates is delivered by the stream of cooling air which passes into heating stove in 216 from cooling stove 226, this stream being at some elevated temperature by virtue of its contact with heated agglomerates in cooling stove 226. It is to be understood here that the temperature of the air passing from cooling stove 226 into heating stove 216 may be sufficiently low to accomplish some additional cooling in that portion of heating stove 216 which is lower in elevation than bustle pipe 243. The addition of cooling air to cooling stove 226 is accomplished by means of blower 218, conduit 219, manifold 221, nozzle feeder conduits 222, and injector nozzle 223.

A portion of the air stream which is added to cooling stove 226 is withdrawn by means of conduit 227. The remaining portion of the air stream together with the combustion products from chamber 241 pass upwardly through heating stove 216 from whence they are exhausted into collection hood 244 for disposal. Depending on the relative quantity of air withdrawn through conduit 227 to the total quality of air added through injector nozzle 223 the withdrawal of this stream may be utilized to serve either of two functions. If the quantity of air that is withdrawn is relatively high, the total mass of coolant that can be forced through the cooling stove will be substantially increased with an associated increase in cooling effectiveness. This will permit the elimination of the addition of the spray mist cooling system which has been used on some cooling stoves of prior art shaft furnaces to obtain adequate cooling. The cooling obtained with only air cooling is far less drastic than air cooling supplemented with spray mist cooling and it is therefore desirable to avoid spray mist cooling wherever possible.

In some instances, however, it may be desired to withdraw only a relatively small portion of the cooling stream from cooling stove 226 through conduit 227. In such instances the withdrawal step will not greatly enhance the effectiveness of the cooling step but it will be effective to remove the boundary layer of air flowing near the inner periphery of cooling stove 226. The withdrawal of this boundary layer, which will be at a relatively lower temperature than the air flowing through the central portion of the stove, will serve principally to improve the uniformity of temperature within heating stove 216 with an associated improvement in product quality.

Where the quantity of air that is withdrawn from cooling stove 226 through conduit 227 is relatively small as compared to the quantity of air added through nozzle 223 it will not ordinarily be economical to reclaim the heat content of such stream. However, it will generally be economical to reclaim the energy of compression of this stream which may be done by cooling the stream in cooler 229 shown diagrammatically, and recompressing it to inlet pressure by means of blower 218.

Where the quantity of air that is withdrawn from cooling stove 226 is relatively high it may prove economical to reclaim both its thermal energy and its energy of compression. Apparatus for accomplishing this is shown in FIGURE 4 which illustrates an arrangement for utilizing the stream of withdrawn air to preheat combustion air for burner 242. In this arrangement the stream of heated air that is withdrawn from cooling stove 226 through conduit 227 is passed through an indirect heat exchanger 245 in heat exchange relationship with a stream of combustion air for burner 242 which is delivered by means of blower 246. Since the stream of air that is withdrawn through conduit 227 may contain some particles of ore which can cause damage to heat exchanger 245 it is advisable to purge this stream, at least of the larger particles, by passing it through a separator 247 of the centrifugal type. Subsequent to the heat exchange step, the stream of withdrawn air is passed through cooler 229, preferably a spray type water washer, for cooling to ambient temperature and removal of fine particles. The addition of air to shaft furnace 211 to replace the stream discharged from heating stove 216 is accomplished, both for the embodiments of FIGS. 3 and 4 by means of blower 232 which induces the flow of a stream of air from the atmosphere through filter 231. Blower 232 compresses the stream of make-up air to a pressure equal to the stream of air from cooler 229. Both streams are then compressed to inlet pressure by means of blower 218.

The best modes known to me to carry out this invention has been described above in terms sufficiently full, clear, concise, and exact as to enable any person skilled in the art to make and use the same. It is to be understood, however, that certain modifications of the above described modes of practicing this invention can be made by a skilled artisan without departing from the scope of the invention which is defined only by the appended claims.

I claim:

1. The method of altering the heat content of a stream of solid material capable of forming a fluent gas-pervious mass and removing small particles associated with said material which comprises, in combination, the steps of: adding a stream of said material to the top of a vertical hollow shaft to form a fluent gas-pervious bed therein having a stockline; permitting a stream of said material to pass from the bottom of said shaft by means of gravity whereby to cause the flow of material through the shaft from the top to bottom thereof; adding a stream of compressed gaseous heat transfer medium to said shaft at a point substantially remote from the top thereof; withdrawing a stream of substantially decompressed gaseous heat transfer medium from said shaft at a point adjacent the top thereof to cause the flow of gaseous heat transfer medium from the point of addition thereof to the point of withdrawal thereof in counter-flow heat transfer relationship to said flow of material; and restricting the flow of gaseous heat transfer medium in a region slightly subjacent the stockline of said bed to increase the velocity of the flow of gaseous heat transfer medium in the region of the restriction to such an extent that the medium will exert an upwardly-directed aerodynamic force on the small particles greater than the force of gravity, whereby said small particles will be removed from said material.

2. The method according to claim 1 wherein the stream of material which is added to the top of the shaft is in a heated condition and the stream of gaseous heat transfer medium that is added to said shaft is relatively cool whereby to accomplish cooling of solid material in said shaft.

3. The method according to claim 2 further comprising the steps of: withdrawing a partially decompressed stream of gaseous heat transfer medium from said shaft at a point intermediate the point at which the compressed stream of gaseous heat transfer medium is added and the point at which the substantially decompressed stream of gaseous heat transfer medium is withdrawn; cooling said partially decompressed stream; re-compressing said partially decompressed stream to the pressure of said compressed stream; and recharging said cooled and recompressed stream into said shaft.

4. Shaft-type apparatus for altering the heat content of solid materials capable of forming a fluent gas-pervious mass comprising in combination: a first-stage heat transfer portion, a second-stage heat transfer portion immediately subjacent said first-stage heat transfer portion and in fluid communication therewith; means for adding a stream of gaseous pressurized heat transfer medium to said second-stage heat transfer portion; means for withdrawing a portion of the stream of heat transfer medium from said shaft-type apparatus at a point adjacent the top of said first-stage heat transfer portion thereby to cause the flow of heat transfer medium through said apparatus from said second-stage heat transfer portion to said first-stage heat transfer portion; means for withdrawing a second portion of the stream of heat transfer medium from said shaft-type apparatus at a point between said second stage heat transfer portion and said first-stage heat transfer portion; means for cooling said second portion of the stream of heat transfer medium; means for recompressing said second portion of the stream of heat transfer medium; and means for re-charging said second portion of the stream of heat transfer medium into said shaft-type apparatus as part of said stream of heat transfer medium.

5. Apparatus according to claim 4 wherein said shaft-type apparatus is a shaft furnace, said first-stage heat transfer portion comprises a heating stove, said second-stage heat transfer portion comprises a cooling stove, and the stream of gaseous pressurized heat transfer medium comprises a stream of cool air at super-atmospheric pressure and further comprising means for adding products of combustion to said heating stove.

6. Cooling apparatus for cooling solid bodies capable of forming a fluent gas-pervious mass comprising, in combination: a hollow shaft having a first stage cooling portion and a second stage cooling portion, said second stage cooling portion being disposed subjacent said first stage cooling portion and in fluid communication therewith; means for adding solid bodies to the first stage of said shaft; outlet means for permitting the escape of solid bodies from said shaft thereby causing the flow of solid bodies through said shaft from said first stage to said second stage; inlet means for adding a stream of compressed cooling medium to said second stage cooling portion; first outlet means to permit the escape of a first portion of said stream from said first stage; second outlet means intermediate said inlet means and said first outlet means to permit the escape of a second portion of said stream; and recycling means for recycling said second portion from said second outlet means to said inlet means, said recycling means comprising cooling means said second portion and compressing means for compressing said second portion.

References Cited by the Examiner

UNITED STATES PATENTS

| | | | |
|---|---|---|---|
| 1,595,257 | 8/26 | Stebbins | 209—141 |
| 2,670,946 | 3/54 | Royster | 263—29 |
| 2,739,708 | 3/56 | Denovan, et al. | 209—138 |
| 2,766,880 | 10/56 | Schaub, et al. | 209—138 |
| 2,784,956 | 3/57 | Vogel | 203—29 |
| 2,857,155 | 10/58 | Dickey | 263—29 |

CHARLES SUKALO, *Primary Examiner.*

HERBERT L. MARTIN, *Examiner.*

UNITED STATES PATENT OFFICE
CERTIFICATE OF CORRECTION

Patent No. 3,159,209                      December 1, 1964

William H. Dailey, Jr.

It is hereby certified that error appears in the above numbered patent requiring correction and that the said Letters Patent should read as corrected below.

Column 6, line 47, after "cooling means" insert -- for cooling --.

Signed and sealed this 6th day of April 1965.

(SEAL)
Attest:

ERNEST W. SWIDER                    EDWARD J. BRENNER
Attesting Officer                       Commissioner of Patents